US011973266B2

(12) United States Patent
Akhmad et al.

(10) Patent No.: US 11,973,266 B2
(45) Date of Patent: Apr. 30, 2024

(54) CONDUCTIVE LIQUID ANTENNA

(71) Applicant: BAE SYSTEMS plc, London (GB)

(72) Inventors: Mohammed-Asif Akhmad, Chelmsford (GB); Jonathan Pinto, Chelmsford (GB)

(73) Assignee: BAE SYSTEMS PLC, London (GB)

( * ) Notice: Subject to any disclaimer, the term of this patent is extended or adjusted under 35 U.S.C. 154(b) by 432 days.

(21) Appl. No.: 17/286,076

(22) PCT Filed: Oct. 7, 2019

(86) PCT No.: PCT/GB2019/052823

§ 371 (c)(1),
(2) Date: Apr. 16, 2021

(87) PCT Pub. No.: WO2020/089578

PCT Pub. Date: May 7, 2020

(65) Prior Publication Data

US 2021/0384617 A1 Dec. 9, 2021

(30) Foreign Application Priority Data

Oct. 29, 2018 (EP) .................................... 18275166
Oct. 29, 2018 (GB) .................................... 1817619

(51) Int. Cl.
*H01Q 3/01* (2006.01)
*H01Q 1/36* (2006.01)
(Continued)

(52) U.S. Cl.
CPC ............... *H01Q 1/364* (2013.01); *H01Q 1/48* (2013.01); *H01Q 9/0407* (2013.01)

(58) Field of Classification Search
CPC .......... H01Q 1/38; H01Q 1/364; H01Q 1/081; H01Q 1/243; H01Q 1/422; H01Q 21/065;
(Continued)

(56) References Cited

U.S. PATENT DOCUMENTS 2,278,601 A 4/1942 Werndl
5,923,104 A * 7/1999 Haaland ................ H02K 44/24
310/11

(Continued)

FOREIGN PATENT DOCUMENTS

CN 103794844 A 5/2014
CN 106654503 A 5/2017

(Continued)

OTHER PUBLICATIONS

International Preliminary Report on Patentability received for PCT Application No. PCT/GB2019/052823. Mail date: May 14, 2021. 10 pages.

(Continued)

*Primary Examiner* — Linh V Nguyen
(74) *Attorney, Agent, or Firm* — Finch & Maloney PLLC

(57) ABSTRACT

An antenna 300 comprising a housing 310 with an internal cavity 315. The cavity 315 holds an adjustable amount of electrically conductive liquid, and a twin-conductor feedline 350 connects the antenna 300 to a receiving and/or transmitting device. The conductive liquid in the cavity 315 of the antenna housing 310 acts as a first element and receives/transmits signals from/to the first feedline conductor, whilst the second feedline conductor is attached to electrical ground 320.

20 Claims, 16 Drawing Sheets

(51) Int. Cl.
*H01Q 1/48* (2006.01)
*H01Q 9/04* (2006.01)

(58) Field of Classification Search
CPC .......... H01Q 5/30; H01Q 9/0457; H01Q 9/14; H01Q 9/145; H01Q 9/16; H01Q 1/48; H01Q 9/0407
USPC .................. 341/702, 700 MS; 343/848, 702, 343/700 MS, 745, 761
See application file for complete search history.

(56) References Cited

U.S. PATENT DOCUMENTS

| | | | | |
|---|---|---|---|---|
| 8,487,822 | B1 * | 7/2013 | Jennings | H01Q 9/14 343/745 |
| 9,716,313 | B1 * | 7/2017 | Mumcu | H01Q 3/04 |
| 2004/0252069 | A1 | 12/2004 | Rawnick et al. | |
| 2012/0075069 | A1 * | 3/2012 | Dickey | H05K 13/00 455/226.1 |
| 2014/0078019 | A1 * | 3/2014 | Kim | H01Q 3/01 343/908 |
| 2014/0168022 | A1 * | 6/2014 | Cetiner | H01Q 3/20 343/761 |
| 2017/0141482 | A1 | 5/2017 | Park et al. | |
| 2017/0194699 | A1 * | 7/2017 | Ouedraogo | G01J 5/0837 |
| 2019/0097315 | A1 * | 3/2019 | Chun | H01Q 1/364 |
| 2020/0014104 | A1 * | 1/2020 | Georgakopoulos | H01Q 3/01 |
| 2023/0031505 | A1 * | 2/2023 | Yamagishi | A61B 5/6833 |

FOREIGN PATENT DOCUMENTS

| | | | | |
|---|---|---|---|---|
| IN | 107658549 | A | 2/2018 | |
| WO | WO-03046491 | A1 * | 6/2003 | G01F 23/284 |
| WO | 2014042486 | A1 | 3/2014 | |
| WO | 2020089578 | A1 | 5/2020 | |

OTHER PUBLICATIONS

International Search Report and Written Opinion received for PCT Application No. PCT/GB2019/052823. Mail date: Jan. 2, 2020. 15 pages.
Search Report under Section 17(5) received for GB Application No. 1817619.8, dated Mar. 8, 2019. 4 pages.
Extended European Search Report received for EP Application No. 18275166.9, dated May 10, 2019. 11 pages.
Alqurashi, et al., "Continuously Tunable Frequency Reconfigurable Liquid Metal Microstrip Patch Antenna," IEEE International Symposium On Antennas and Propagation & USNC/URSI National Radio Science Meeting, Jul. 9, 2017. pp. 909-910.
Bharambe, et al., "Reversibly Reconfigurable Liquid Metal Patch Antenna Using A Superhydrophobic Spray-Coating," IEEE International Symposium On Antennas and Propagation & USNC/URSI National Radio Science Meeting, Jul. 8, 2018. pp. 287-288.
Xing, et al., "A Monopole Water Antenna," IEEE Loughborough Antennas & Propagation Conference, Nov. 12-13, 2012. 4 pages.

* cited by examiner

CONDUCTIVE LIQUID ANTENNA

FIELD OF INVENTION

The present invention relates to an antenna for transmitting and/or receiving signals via electromagnetic radiation, e.g. radio waves. Specifically, the present invention relates to an antenna incorporating an electrically conductive liquid suspended within a cavity of a housing.

BACKGROUND

Antennas are an essential component of all radio equipment, for both transmission and reception of radio signals. They provide the interface between received/transmitted radio waves and electric signals sent to and received from radio tuning equipment. A traditional antenna may comprise an array of solid electrical conductors, known as elements, electrically connected to a receiver and/or a transmitter. The size and shape of an antenna element affects the wavelength(s) at which it performs most efficiently, as both a transmitter and a receiver. The frequency range (or "impedance bandwidth") over which an antenna functions is therefore dependent upon, amongst other factors, the design and form factor of the antenna and its element(s). In order to provide the greatest range of bandwidth, adjustable antenna elements can be used, or multiple fixed antenna elements may be used in parallel. However variable-length antenna elements introduce additional moving parts which reduces the reliability of the antenna, and multiple fixed antennas together (known as "antenna farms") take up a lot of space. Previous attempts have been made to address this problem, for example in WO2014042486 and GB2435720, which both describe the use of an adjustable liquid antenna.

The present invention seeks to provide a more versatile antenna adapted to operate over a broader range of frequencies.

SUMMARY OF INVENTION

According to a first aspect of the invention there is provided an antenna comprising a housing having an internal cavity, and the cavity comprises an adjustable amount of electrically conductive liquid. The antenna also comprises a twin-conductor feedline connecting the antenna to a receiving and/or transmitting device. The conductive liquid in the cavity of the housing acts as a first element and is adapted to receive/transmit a signal from/to the first feedline conductor, and the second feedline conductor is attached to electrical ground. This provides an antenna that can be easily adjusted to cover a different range of radio frequencies.

Preferably, the antenna also comprises a second element which is separated from the first element by an insulator. The second element may be a conductive ground plane and connected to the second feedline conductor.

Preferably still, the insulator is a foam, providing a lightweight dielectric to maintain electrical separation between the first and second elements.

In one example, the twin-conductor feedline is a coaxial cable which connects the antenna to a receiving and/or transmitting device. Coaxial cables provide lower error rates in data transmitted over the feedline, offering low transmission losses and a well-defined characteristic impedance value. Preferably, the conductive liquid is a liquid metal or liquid metal alloy. Preferably still, the conductive liquid suspended in the internal cavity is Galinstan®, which is comparatively low toxicity, a liquid at room temperature with reasonable viscosity, and has good 'wetting' and electrical characteristics.

In another example, the antenna also comprises a pump, a battery to power the pump, and a reservoir for storing conductive liquid. Preferably, the pump is adapted to pump the conductive liquid into and out of the internal cavity within the first element. This adjusts the size (and shape) of the conducting liquid element, and therefore the frequency range over which the antenna can efficiently operate.

Preferably still, the housing comprises a vent to allow air (or whatever the surrounding atmosphere is) to escape or enter the internal cavity as the conductive liquid is pumped into or out of it.

In one example, the first element is planar, e.g. a patch antenna, and the cavity has a circular cross-section tapered or concave downwards forming a shallow bowl or cone. The low profile of the antenna means it can be easily incorporated into clothing or portable wireless devices. Preferably, the first element is flexible, allowing it to be incorporated into flexible materials, such as clothing.

In another example, the first element housing is conical. Preferably, the antenna comprises a second element. The second element is a disc, narrower than the broadest diameter of the first element cone.

In another example, the first element housing is the housing comprises two elongate arms extending at an angle from each other in a "V" formation.

Preferably still, the housing comprises a metallic unit at the base of the below the cavity in the housing element. The small metallic cone is connected to the first feedline conductor. The antenna is adapted to receive and/or transmit the signal from the first feedline conductor from/to the conductive liquid within the cavity of the first element via capacitive coupling. This means that there is no need for the first feedline conductor to come into direct electrical contact with the conductive liquid within the cone (i.e. the first element). Without the need to pierce the first element housing, there is less chance of a leak forming, and the antenna is more robust.

In one example, the first feedline conductor engages the conductive liquid directly by passing through the first element into the cavity.

FIGURES

The present invention will now be described, by way of example only, with reference to the accompanying drawings, in which:

FIGS. 1*a* and 1*b* show a schematic drawing, in perspective and a cross-sectional view respectively, of an antenna according to a first example;

Figure 11A:
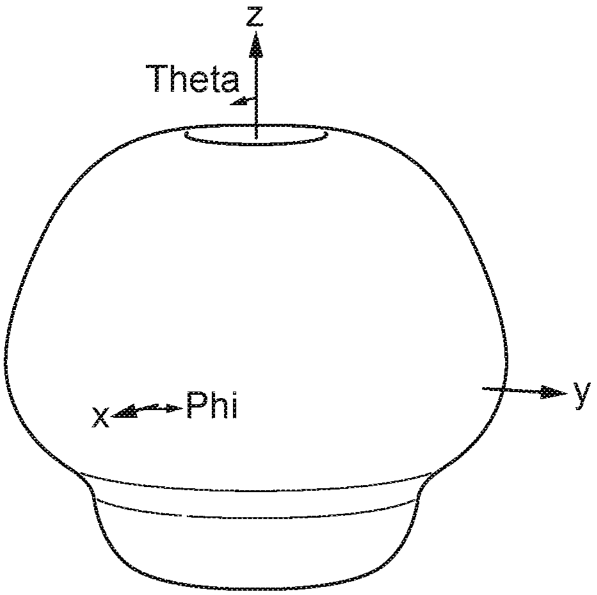
Figure 11B:
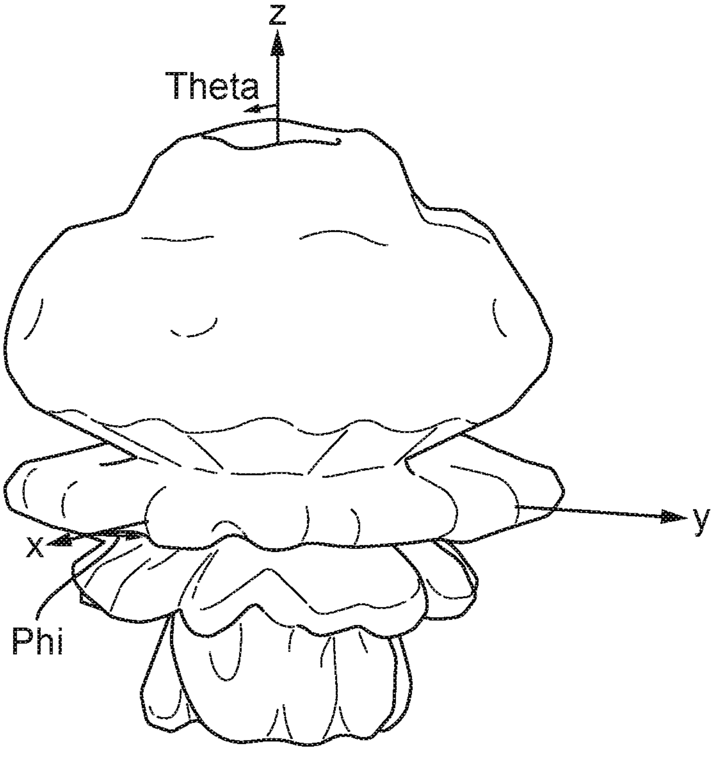
Figure 12:
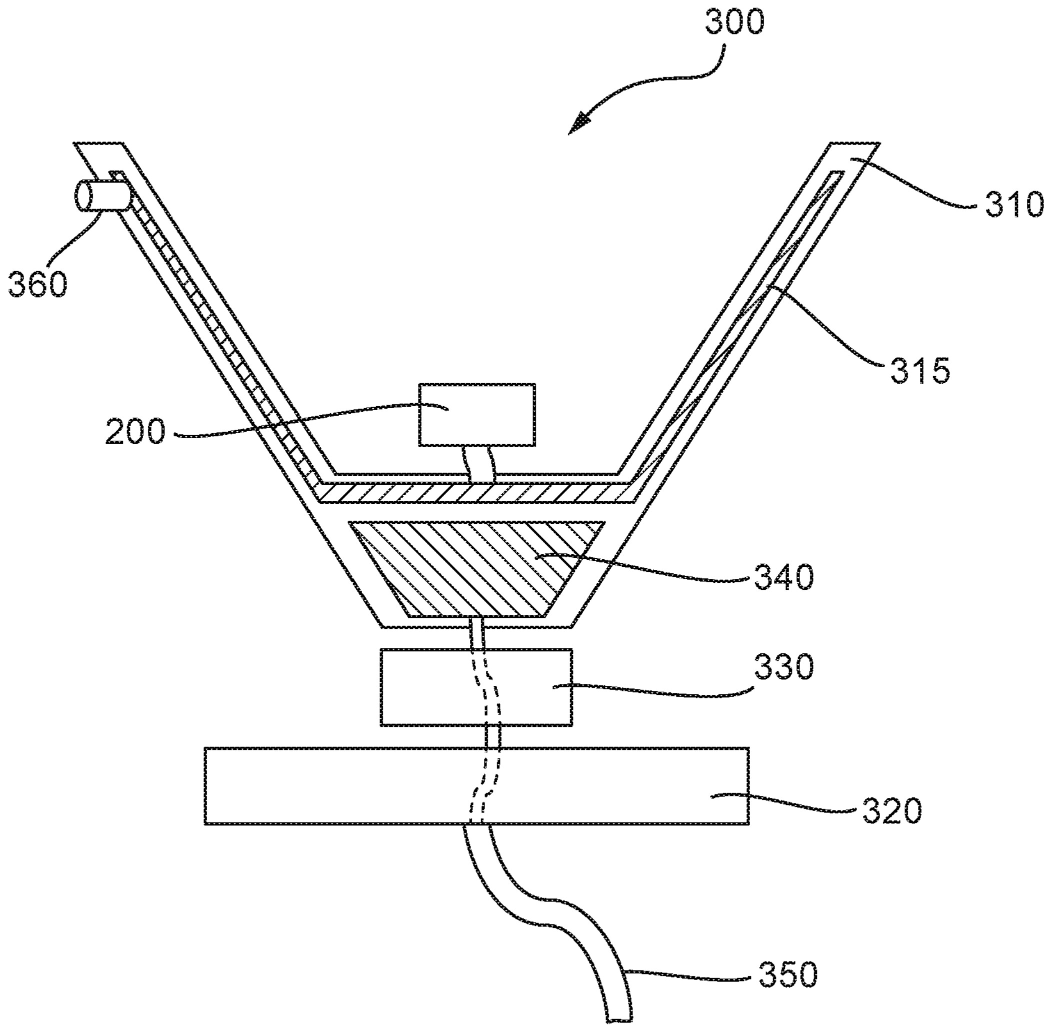
Figure 13:
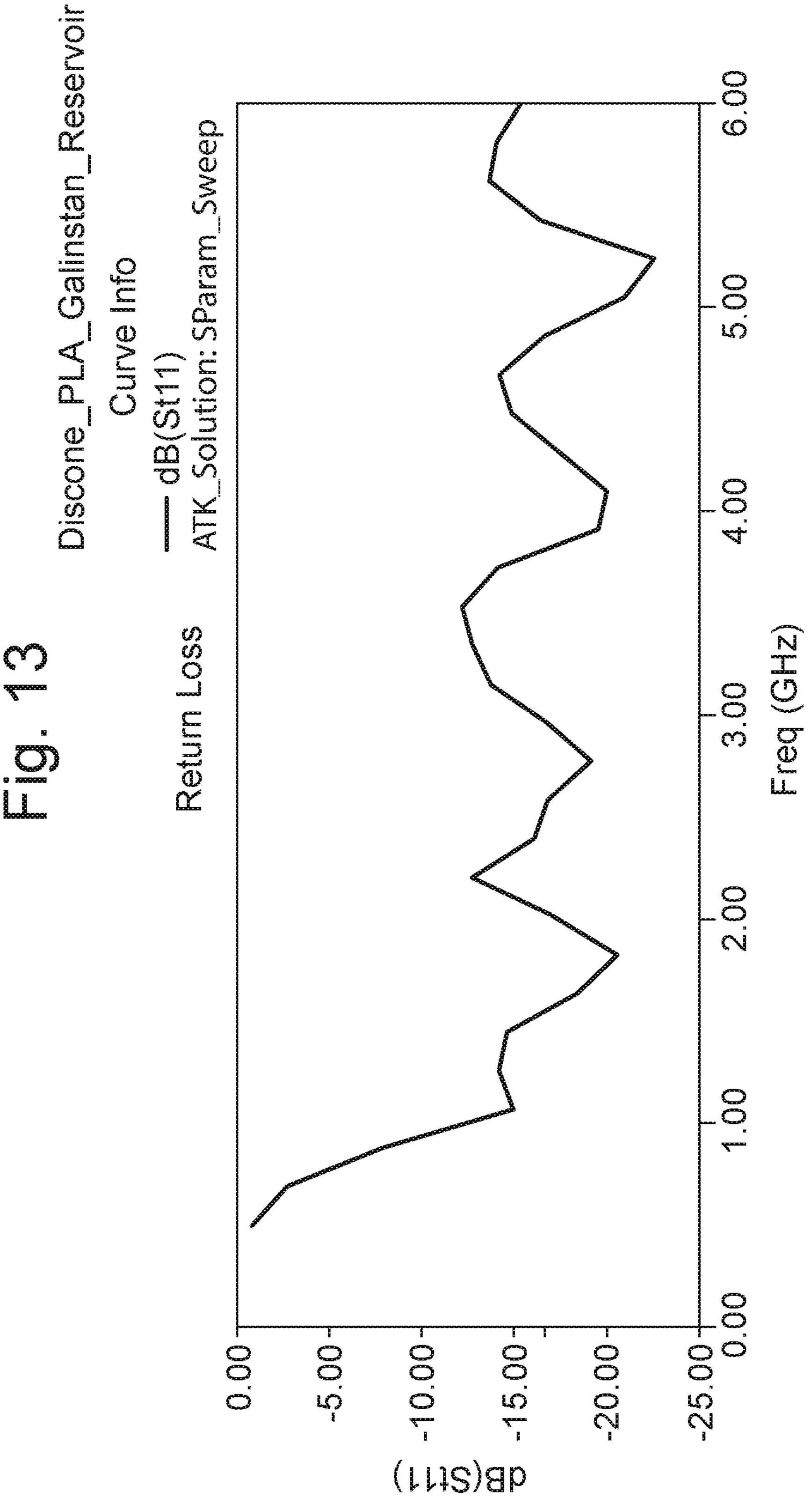
Figure 14:
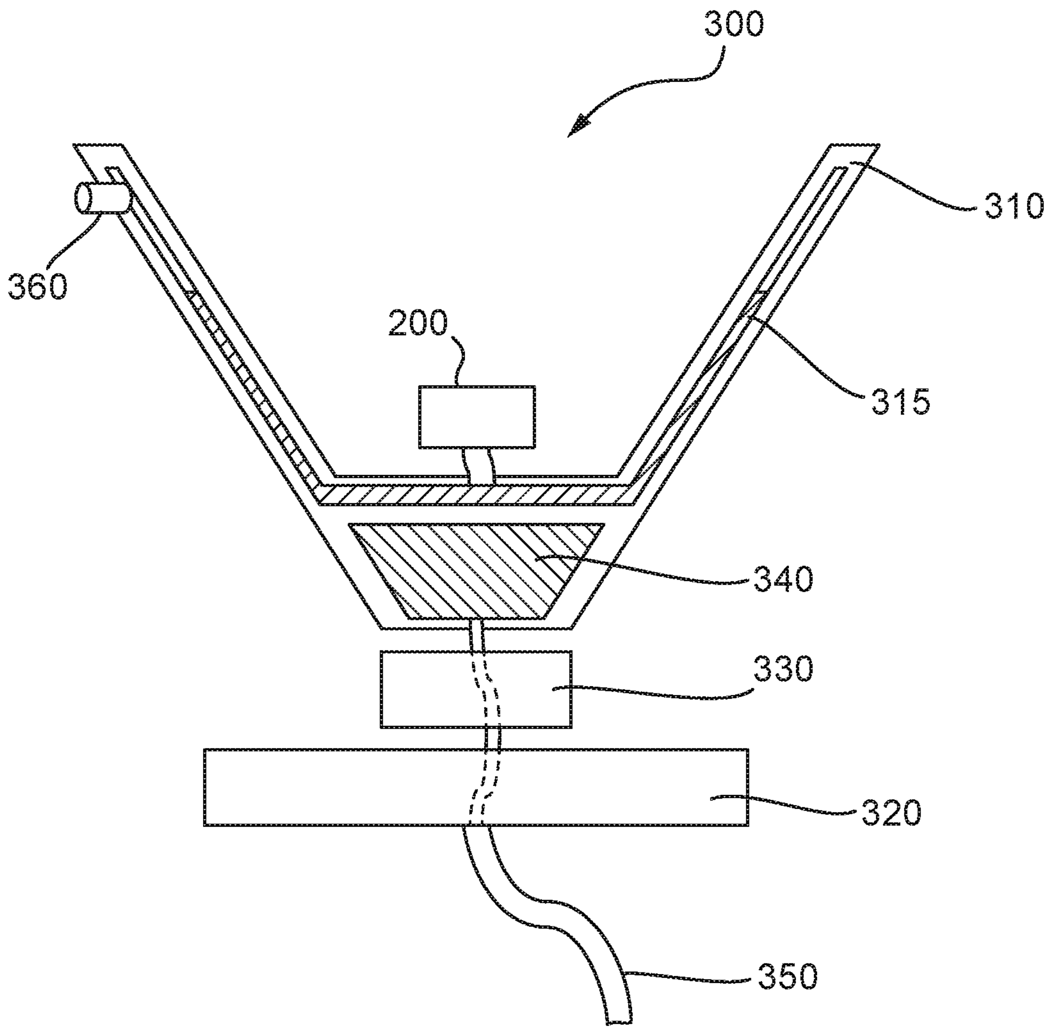
Figure 15:
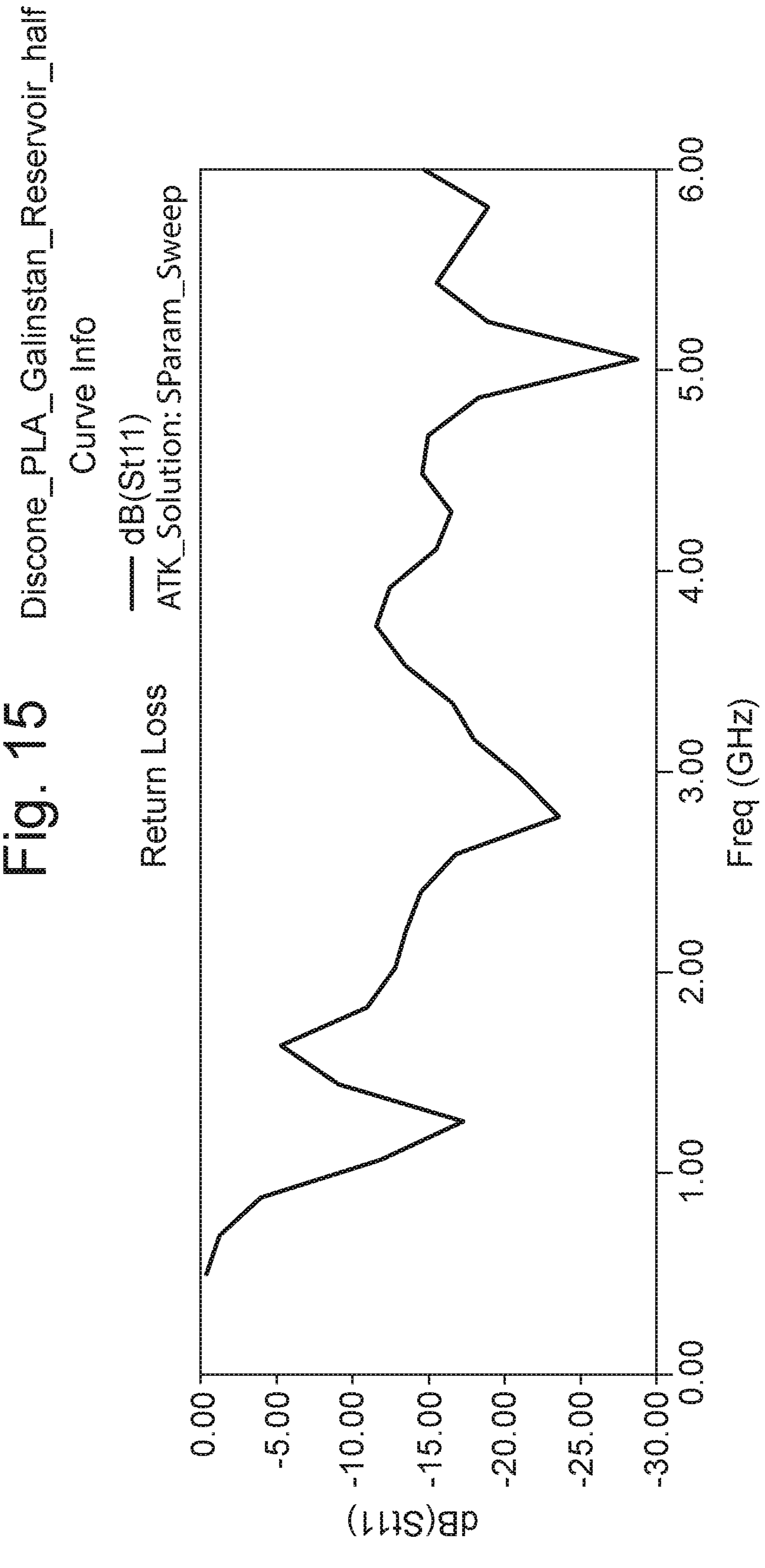
Figure 16:
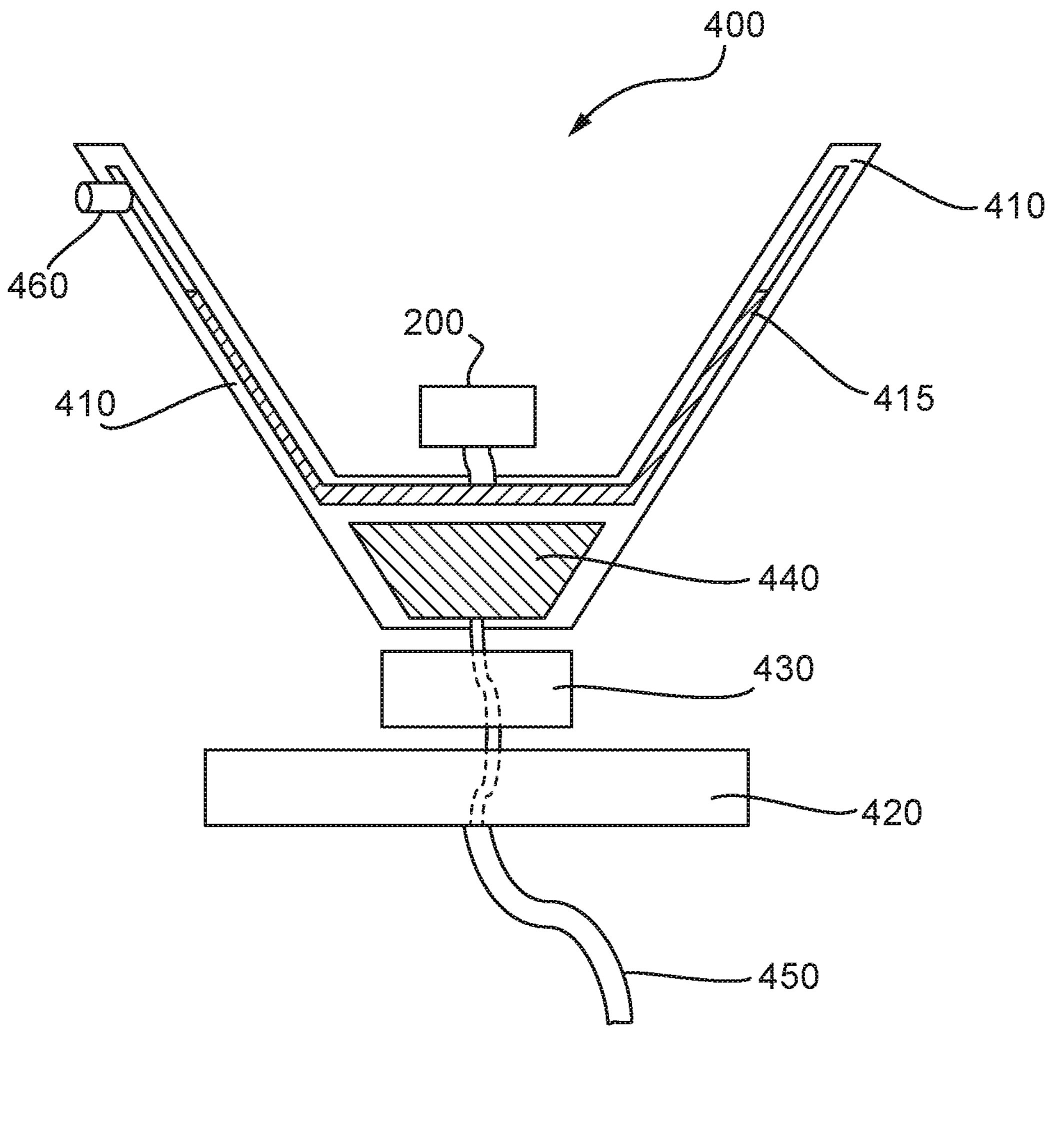

FIGS. 11*a* and 11*b* are simulated radiation patterns of an antenna according to the fourth example;

FIG. 12 is a schematic drawing of an antenna according to a fifth example;

FIG. 13 is a graph of the simulated reflection loss magnitude of an antenna according to the fifth example;

FIG. 14 is a schematic drawing of an antenna according to a sixth example;

FIG. 15 is a graph of the simulated reflection loss magnitude of an antenna according to the sixth example; and FIG. 16 is a schematic drawing of an antenna according to a seventh example.

DESCRIPTION

Patch Antenna

Figure 1A:
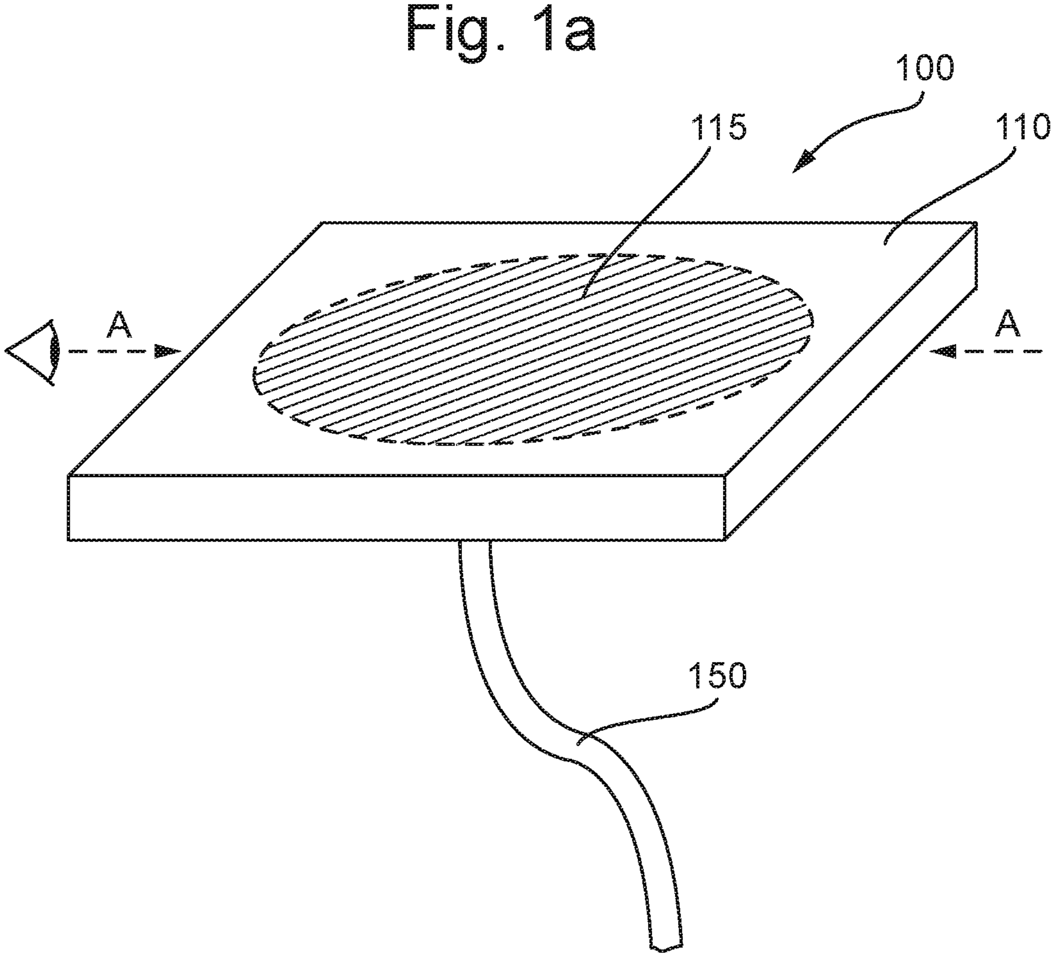
Figure 1B:
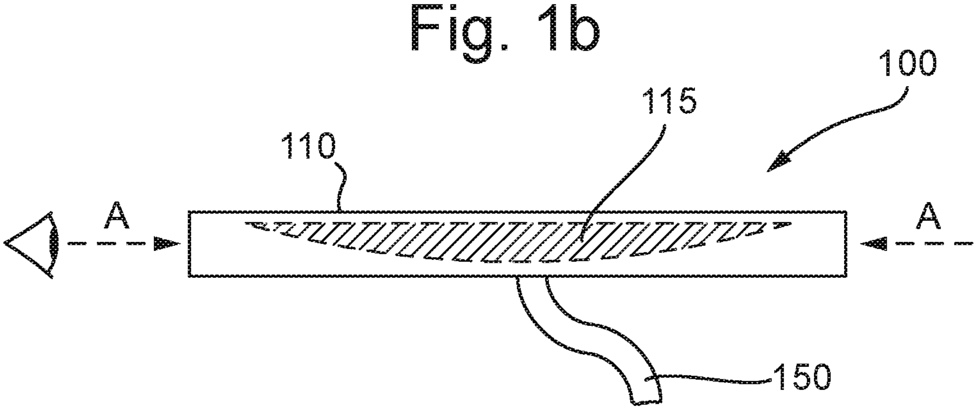

FIGS. 1*a* and 1*b* show an example antenna 100 according to the first embodiment of the present invention. In this example, the antenna 100 is a monopole antenna comprising a radiating element housing 110 having an internal cavity 115. The internal cavity is substantially fully enclosed within the housing 110. In the example shown in FIGS. 1*a* and 1*b*, the housing 110 has a low profile, e.g. much wider and longer than it is tall, known as a "patch antenna". Patch antennas are practical at microwave frequencies and are widely used in portable wireless devices.

The antenna 100 also comprises a feedline 150 connecting the antenna 100 to a receiving and/or transmitting device (not shown). The feedline 150 is a specialized transmission cable (or other structure) designed to conduct an alternating current at radio frequencies. The feedline comprises twin-conductor channels, example configurations of which include: parallel line (ladder line); coaxial cable; stripline; and microstrip. In one example, the feedline 150 is a coaxial RF cable with SMA connectors for ease of connection.

As can be seen in the cross-sectional view across line "A" in FIG. 1*b*, in one example the cavity 115 within the housing 110 has a circular cross-section across the horizontal plane and is tapered (or concave) downwards towards the centre-bottom of the disc, thus forming a shallow bowl or cone shaped cavity 115. The cavity 115 is adapted to hold and retain an electrically conductive liquid (not shown) in electrical communication with one channel of the twin-conductor feedline 150, so that the electrically conductive liquid within the cavity 115 acts as a first element to transmit and/or receive radio waves, converted from/to electrical signals transmitted along the feedline 150. The other channel of the twin conductor feedline (the ground wire) is attached to a ground plane. A ground plane is an electrically conductive surface, usually connected to electrical ground, which is larger than the operating wavelength of the antenna, and serves as a reflecting surface for radio waves transmitted from the first element.

The amount of conductive liquid in the cavity 115 may be adjusted so as to tune the antenna 100 for use at different frequencies, and frequency ranges. The shallow bowl or inverted cone shape of the cavity 115 means that the conductive liquid collects in the centre of the cavity 115, therefore always forming a circular conductive element no matter how much conductive liquid is present in the cavity 115. The shape of the cavity is fashioned to suit the antenna's requirements. In some examples the cavity may comprise channels, providing pathways for the conductive liquid. The channels can be designed to shape the conductive liquid antenna as needed, e.g. providing radial "arms".

Figure 2:
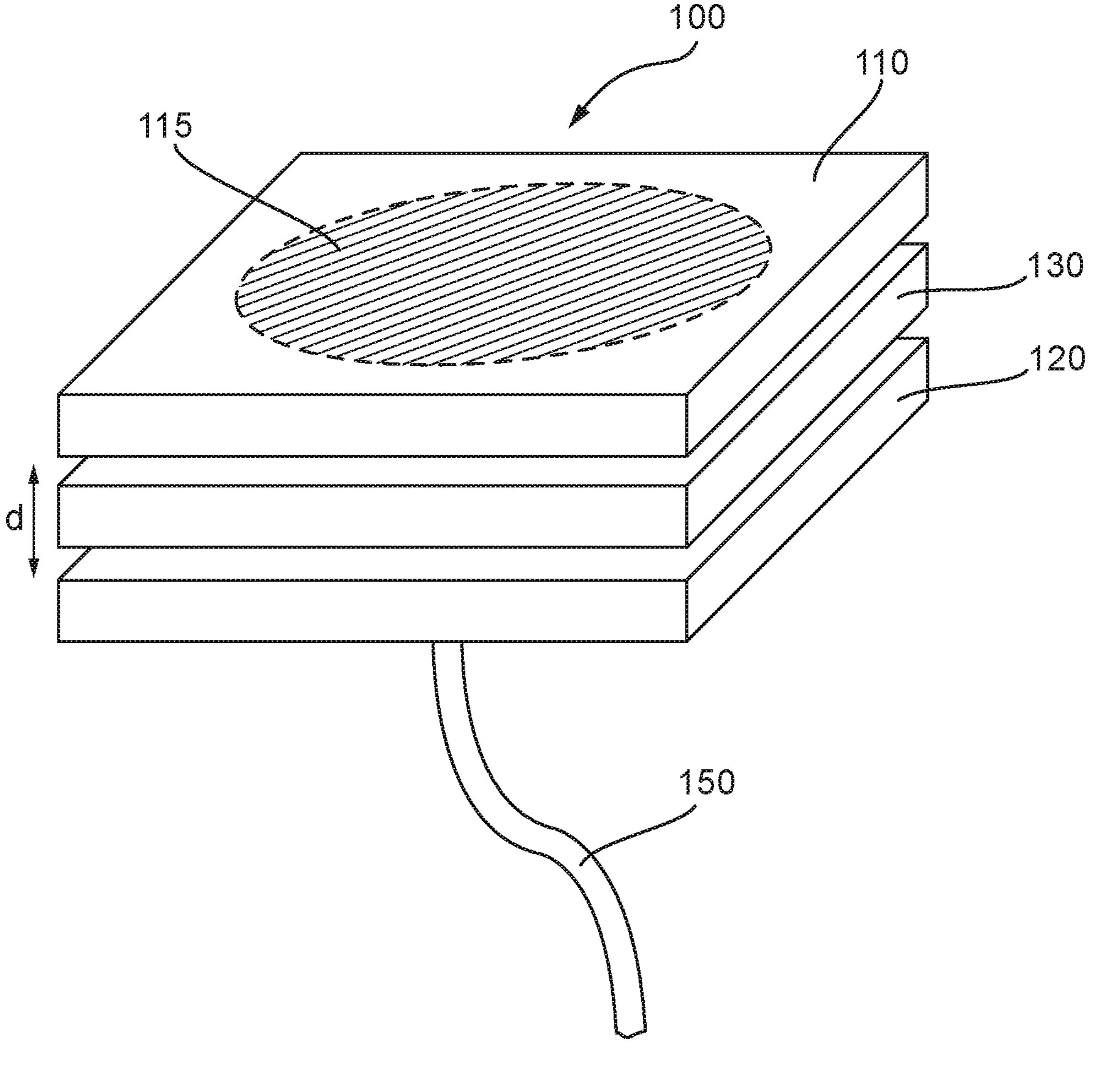
FIG. 2 is a schematic drawing of an antenna according to a second example.

FIG. 2 shows a second example of the first embodiment of the invention, incorporating a second electrically conductive element 120. The second element 120 is located below the housing 110, and separated from the housing 110 by a distance "d". The housing 110 and second element 120 are separated by a layer of insulating material 130, e.g. a dielectric material such as foam. The second element 120 may be formed on top of, for example, a thin sheet of FR4 or similar material with a hole for the feedline 150 to pass through to reach the housing 110 (and the first element formed of a conductive liquid within the internal cavity 115). The second element 120 acts as a ground plane to reflect the radio waves from the first element within the housing 110, and the conducting surface formed by the second element 120 is at least a quarter of the wavelength (λ/4) of the targeted radio waves in diameter. In some examples, the ground plane 120 has a discontinuous surface, e.g. several wires λ/4 long radiating from the base of a quarter-wave whip antenna.

In this example, one channel of the twin-conductor feedline 150 is electrically connected to the first element formed by the conductive liquid in the cavity 115 of the housing 110, and the second channel of the feedline 150 is in electrical contact with the ground plane 120.

In a preferred example of the first embodiment, the antenna is formed with the following dimensions:

- Second element 120 square length (e.g. FR4 length)—22 cm;
- Separation distance "d" (e.g. foam thickness)—15 mm;
- Second element 120 (e.g. FR4) thickness<1 mm;
- First element housing 110 (e.g. 3D printed upper section) thickness<5 mm; and
- Cavity (e.g. circular patch) diameter—13 cm.

Figure 3:
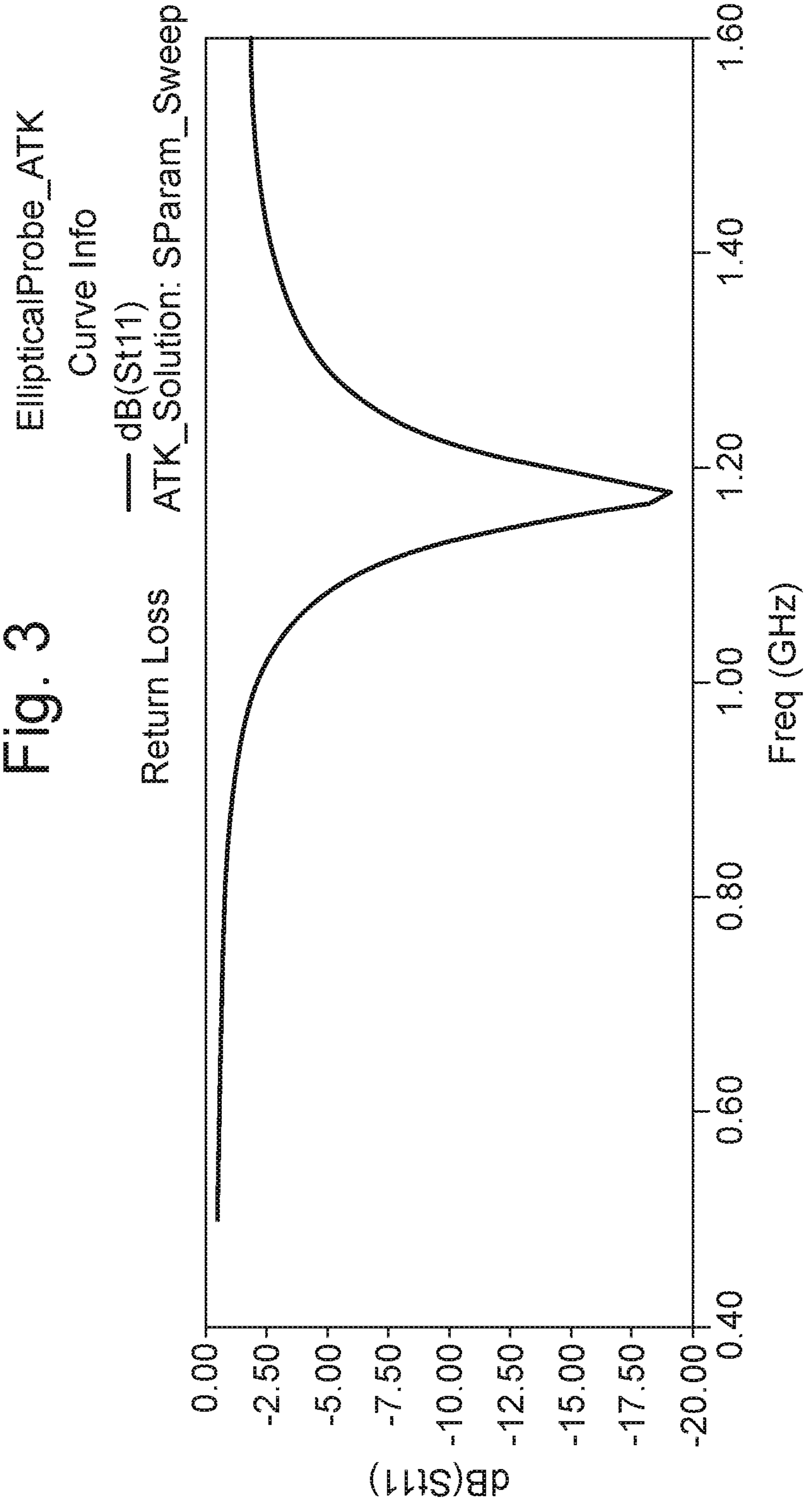
FIG. 3 is a graph of the simulated reflection loss magnitude of an antenna according to the second example.
Figure 4:
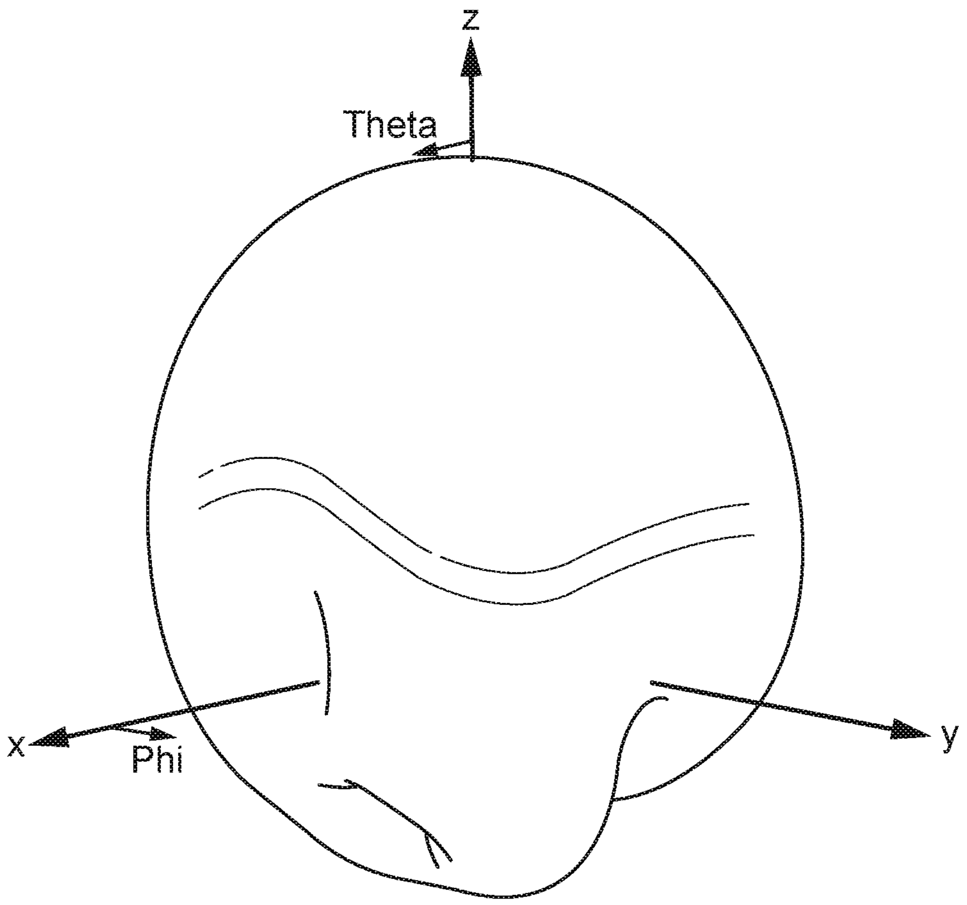
FIG. 4 is the estimated radiation pattern of an antenna according to the second example.

FIG. 3 is a graph of the simulated reflection loss magnitude achieved over 0.4-1.6 GHz, and FIG. 4 shows the resultant radiation pattern expressed as realised gain at 1.2 GHz for an antenna as described by the above example and dimensions.

Figure 5:
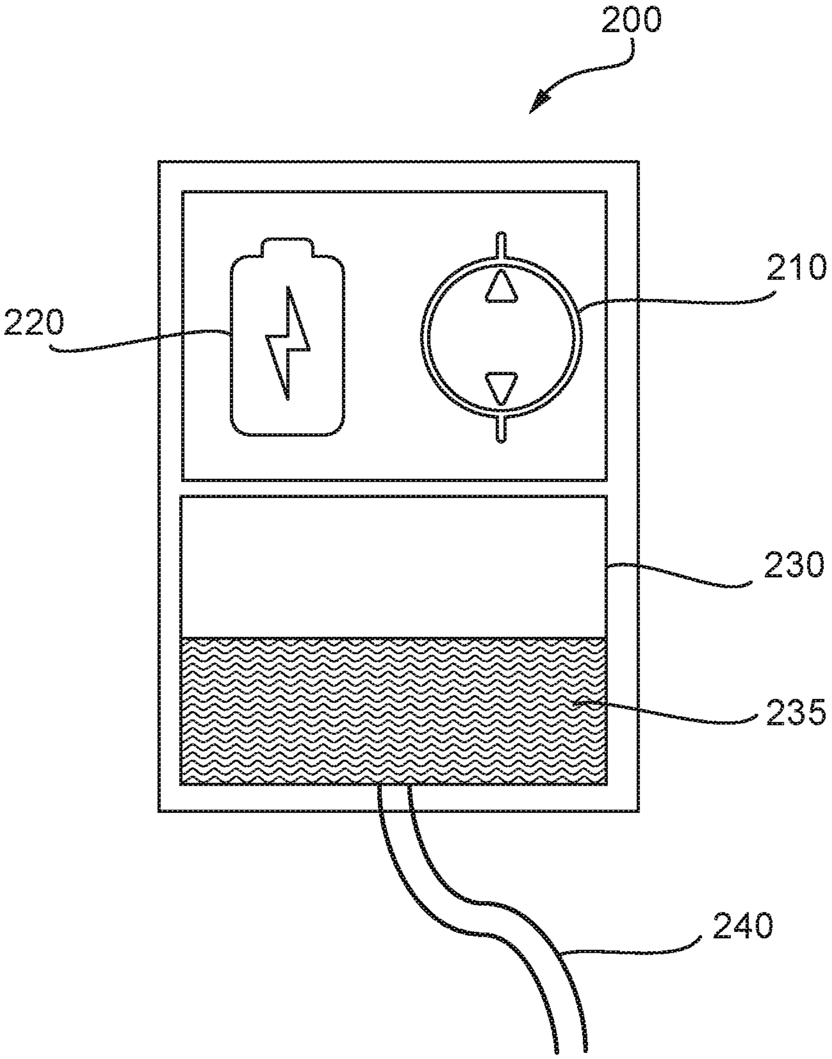
FIG. 5 is a schematic drawing of a pump and reservoir arrangement according to a first example.

FIG. 5 shows a schematic view of a pump and reservoir arrangement 200 which comprises a pump 210, a battery 220 (or other self-contained power source) to power the pump 210, and a reservoir 230 to hold a supply of electrically conductive liquid 235. The reservoir 230 of the pump and reservoir arrangement 200 is in fluidic communication with the cavity 115 of the housing 110 via a channel 240. The pump and reservoir arrangement 200 is adapted to pump the conductive liquid 235 into and out of the cavity 115 of the housing 110, and may be operated by control means (not shown). The control means may be operated either wirelessly or by wired means, or may be fully autonomous (e.g. pre-programmed).

Figure 6:
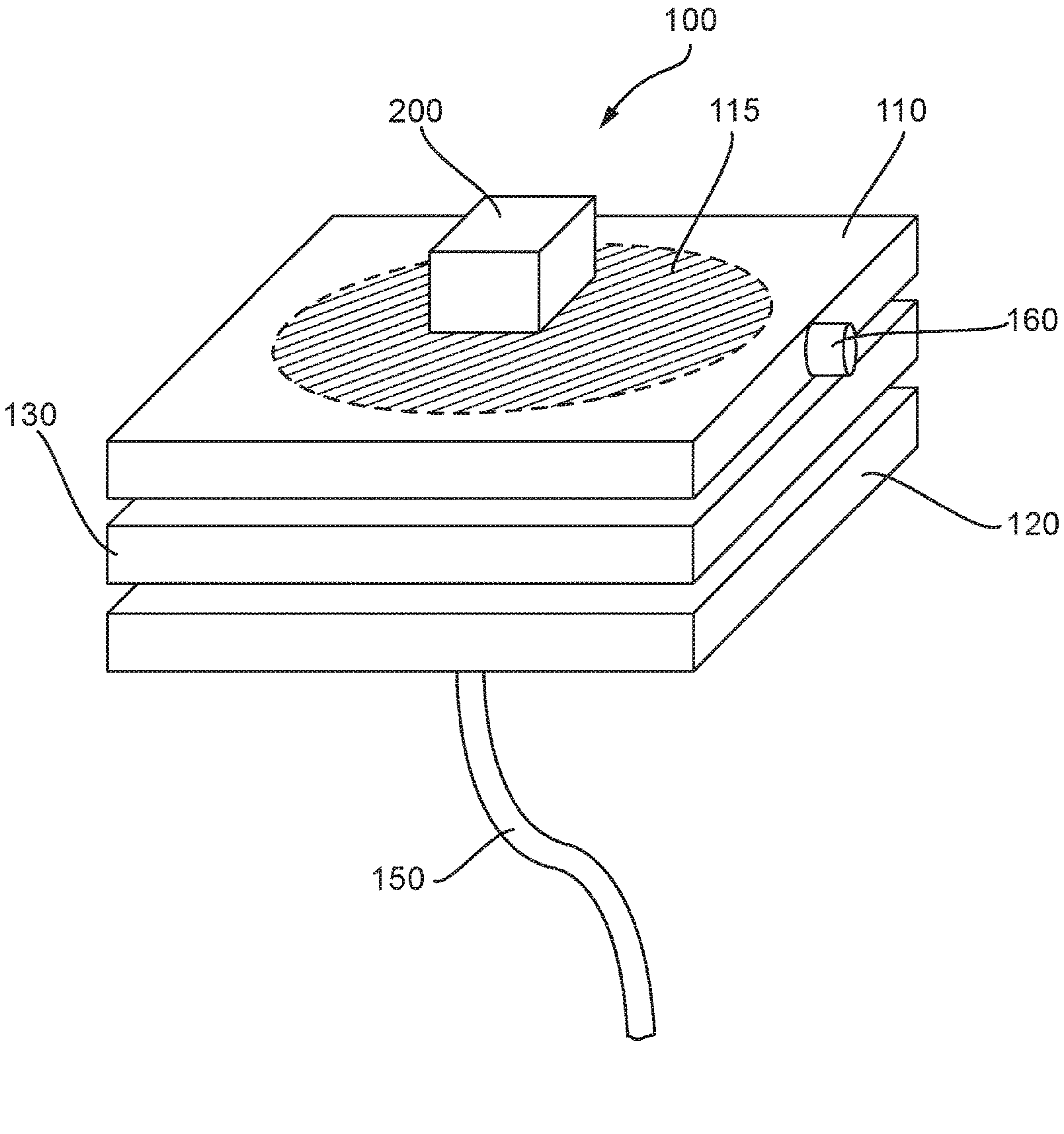
FIG. 6 is a schematic drawing of an antenna according to a third example.

The pump and reservoir arrangement 200 may be incorporated into the antenna 100 as shown in the example in FIG. 6, located on top of the housing 110 of the antenna 100. By adjusting the amount of conductive liquid in the cavity 115, the bandwidth and operating frequency of the antenna 110 can be adjusted (or "tuned") as desired.

In order to allow the change in volume of the conductive liquid inside the cavity 115, the element housing 110 of the first element also comprises a vent 160 to allow air (or other liquid/gas depending on the surrounding operating environment or atmosphere of the antenna 100) to escape or enter the cavity 115 as required.

Figure 7:
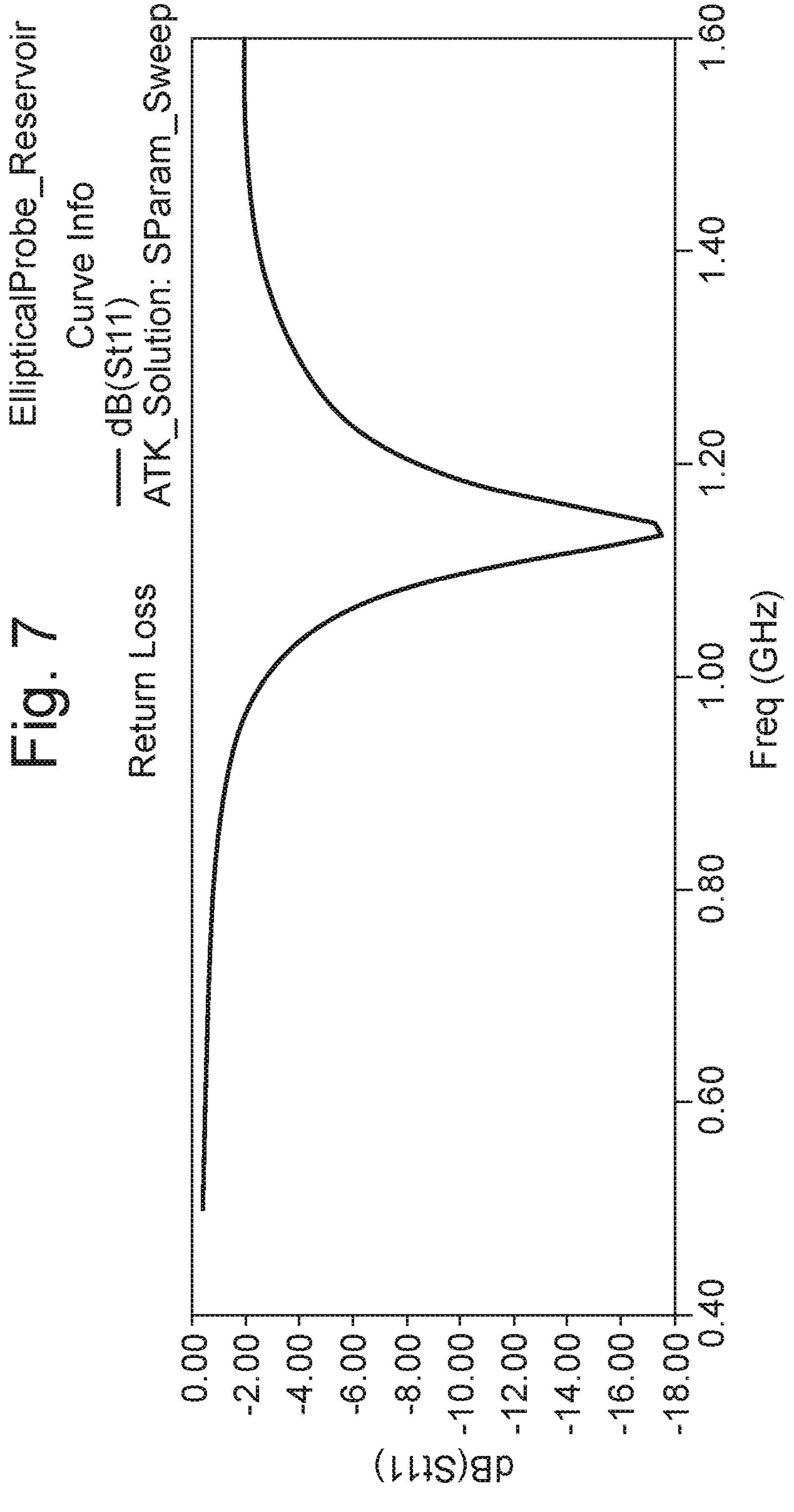
FIG. 7 is a graph of the simulated reflection loss magnitude of an antenna according to the third example.

The pump and reservoir arrangement 200 may be spaced away from the housing 110 by the incorporation of more foam. Any wires carrying power to the pump and reservoir arrangement 200 from outside of the antenna 100 would likely impact the antenna's performance. Therefore a self-contained battery-powered unit is preferable. To examine the operational impact of a battery 220, conductive liquid reservoir 230 and pump 210 when placed above the antenna 100, a metallic box was simulated with dimensions 4 cm×4 cm×2 cm (height), positioned 0.5 cm above the antenna 100. The effect of the pump and reservoir arrangement 200 located on top of the antenna 100 can be seen in FIG. 7, and the simulations suggest that positioning these items above the housing 110 have little impact on the antenna's 100 performance.

In one example (not shown) the housing 110 also comprises a small metallic body, for example a disc, beneath the cavity 115 at the base of the housing 110, connected to the first conductive channel of the twin-conductor feedline 150. The signal from the first feedline 150 conductor is received and/or transmitted from/to the conductive liquid within the housing 110 via capacitive coupling with the metallic disc. This removes the need to have the conductive feedline 150 in direct electrical contact with the conductive liquid within the cavity 115.

Discone Antenna

Figure 8:
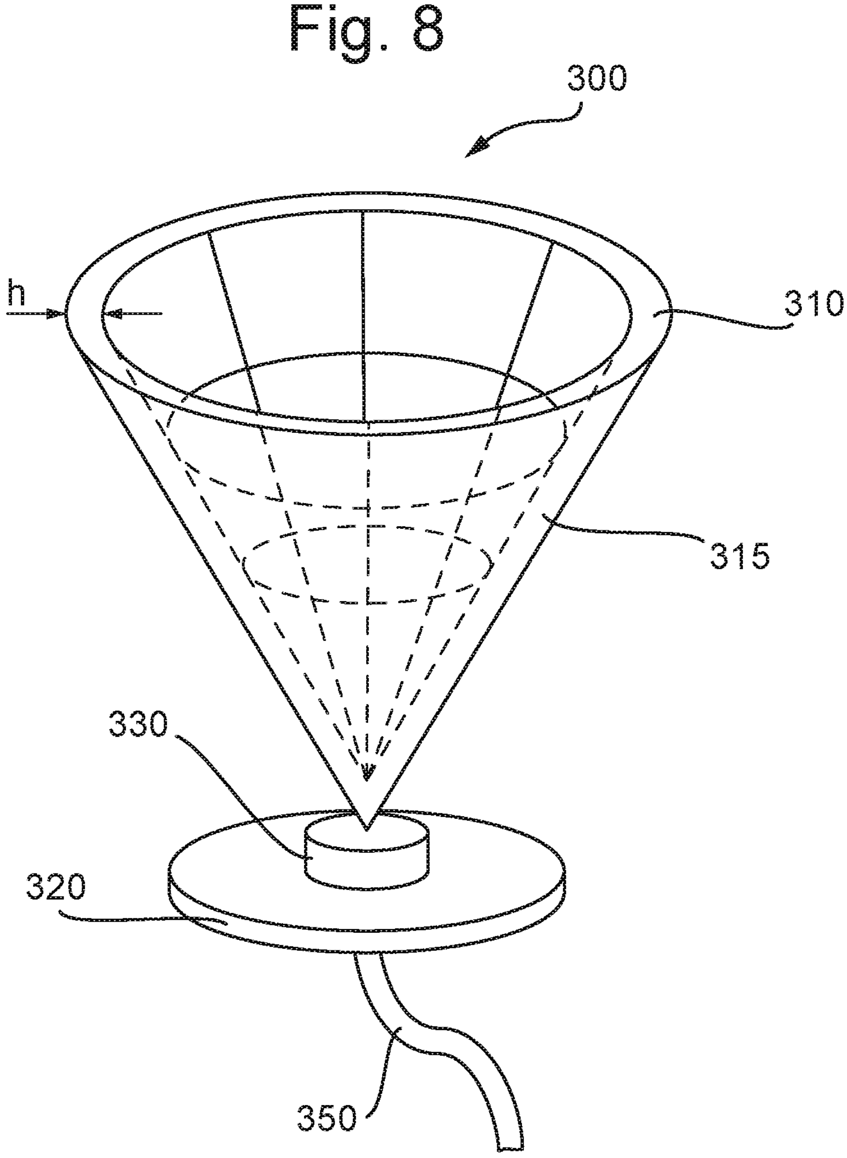
FIG. 8 is a perspective schematic view of an antenna according to a fourth example.
Figure 9:
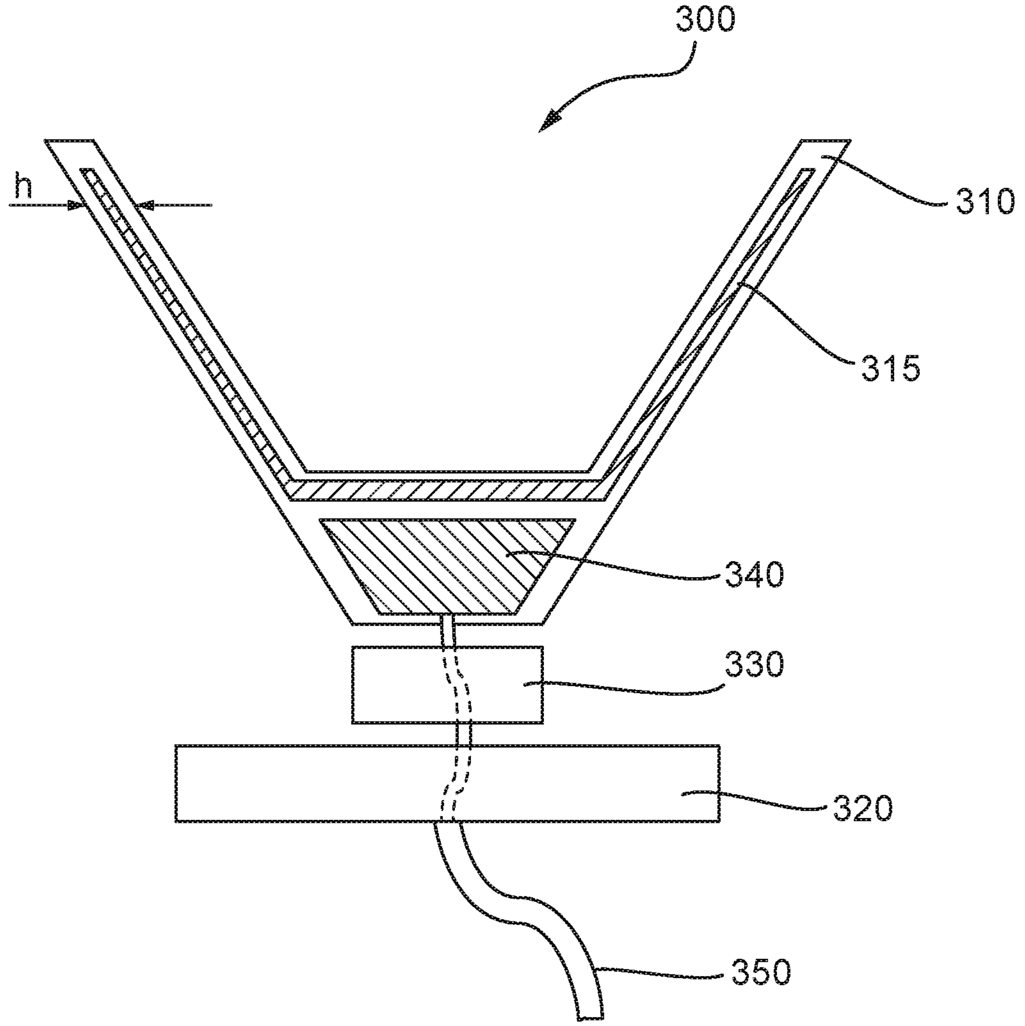
FIG. 9 is a side-on schematic drawing of an antenna according to the fourth example.

FIG. 8 and FIG. 9 show a second embodiment of the present invention, in perspective and side-on respectively. In this embodiment, an antenna 300 is a discone antenna, comprising a hollow conical housing 310 for a first antenna element. The conical walls of the housing 310 have a width of "h", and comprise an internal cavity 315 within the walls of the housing 310. The cavity 315 retains an electrically conductive liquid, and requires a relatively small amount of conductive liquid compared to other types of antenna. The conductive liquid held within the cavity 315 of the housing 310 acts a first element for the antenna 300. The antenna 300 is able to maintain a good match over a broad band and provide a uniform pattern with maximum gain near or on the horizon at all azimuth angles.

The amount of conductive liquid in the cavity 315 may be adjusted so as to tune the antenna 300 for use at different frequencies or frequency ranges. The hollow conical shape of the cavity 315 results in the conductive liquid collecting in the bottom of the cavity 315, therefore forming a (sometimes truncated) conical conductive element no matter how much conductive liquid is present in the cavity 315. The design has advantages over the first embodiment (i.e. a patch antenna) in that it is inherently wide-band (1 GHz to 6 GHz), and can be adapted to work over a range of frequencies by partially filling the internal cavity 315 inside the cone 310.

The antenna 300 also incorporates a second element 320 acting as a ground plane. In one example, the ground plane 320 is narrower than the broadest diameter of the housing cone 310 (and therefore the broadest possible diameter of the first element formed by the conductive liquid held in the cavity 315). The ground plane 320 and the housing 310 are separated from each other by an insulating layer 330, e.g. a dielectric material such as foam.

In the example shown, the housing 310 also comprises a small metallic cone 340 at the base of the housing 310, connected to a first conductive channel of a twin-conductor feedline 350. The signal from the first feedline 350 conductor is received and/or transmitted from/to the conductive liquid within the housing 310 via capacitive coupling with the metallic cone 340, which excites the surface currents in the conductive liquid element. This removes the need to have the conductive feedline 350 in direct electrical contact with the conductive liquid within the cavity 315, reducing the risk of a leak of the conductive liquid. The second conductive channel of the feedline 350 is in electrical contact with the ground plane 320, and the rest of the feedline 350 may be fed through a small hole in the ground plane 320 and insulating layer 330 to reach the metallic cone 340.

In a preferred example of the second embodiment, the antenna 300 has dimensions as follows:

Ground plane 320 diameter—70 mm;

Conical housing 110 height—10 cm;

Metallic cone 340 capacitive coupling element—1 cm;

Coupling gap—1 mm; and

Conical housing 110 upper diameter—12 cm.

Figure 10:
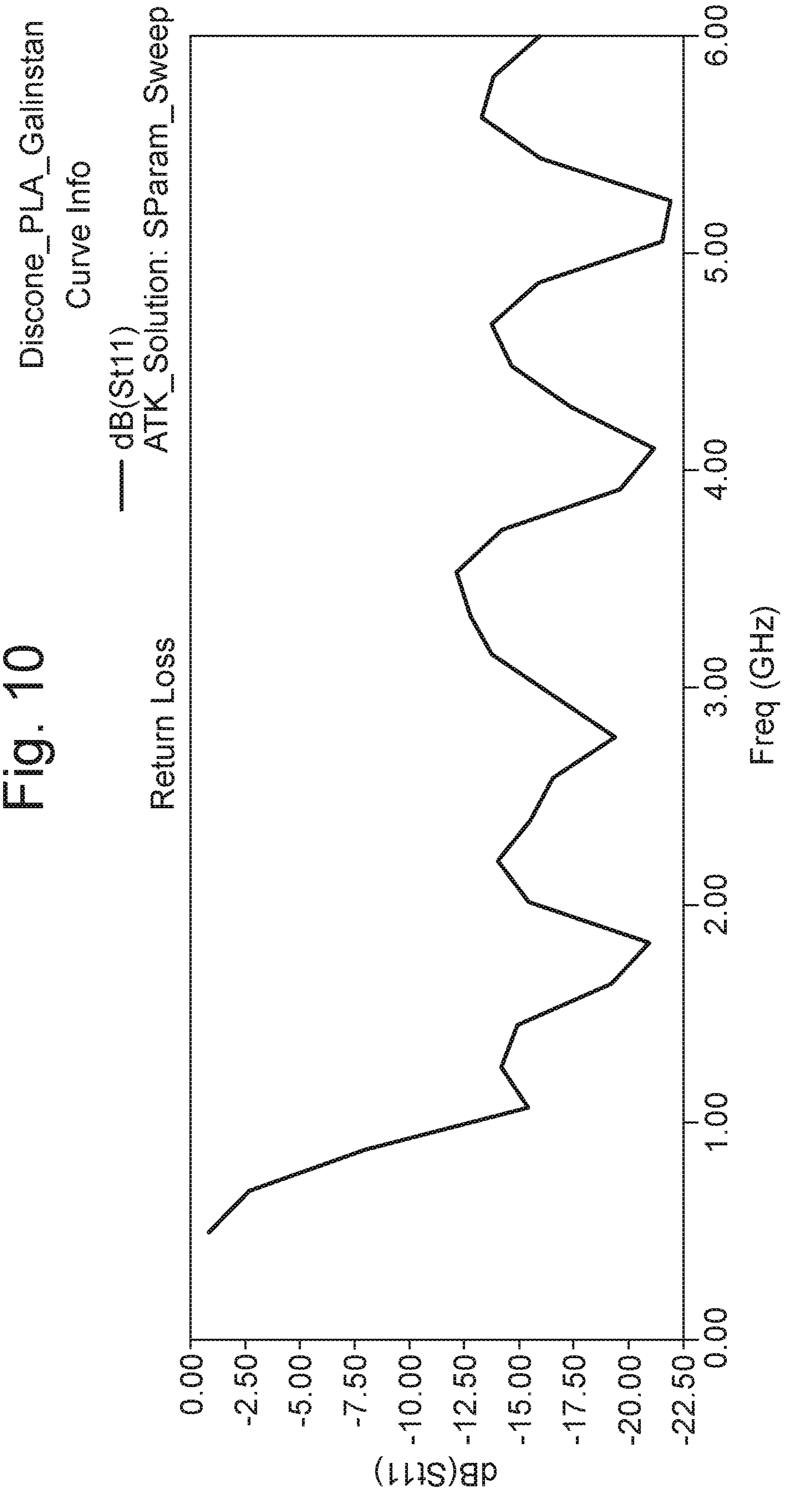
FIG. 10 is a graph of the simulated reflection loss magnitude of an antenna according to the fourth example.

FIG. 10 shows the simulated reflection loss magnitude achieved over 1-6 GHz for an antenna 300 according to the above example and dimensions, wherein the discone cavity 315 is fully filled with a conductive liquid.

FIGS. 11*a* and 11*b* show the radiation patterns (or "realised gain") at 2.4 GHz and 6 GHz, respectively, for the antenna 300 according to the present example described above. In this simulation, the discone cavity 315 is filled with a conductive liquid, and can be seen to produce a good uniform gain on or near the horizon.

In the example shown in FIG. 12, a pump and reservoir arrangement 200, as previously described, is located within the hollow space inside of the discone antenna 300. The pump 210, reservoir 230, battery 220 and any control means are positioned in a region of minimum radiated electric field so as to have minimal effect on the electrical characteristics of the antenna 300. An electrically conductive liquid 235 may be be pumped in or out of the hollow cavity 315 of the housing 310 from/to the reservoir 235 as desired. Where the volume of conductive liquid is adjustable, the cavity 315 also comprises a vent 360 so as to allow air (or any other liquid/gas depending on the surrounding operating environment or atmosphere of the antenna 300) in and out of the cavity 315 as the volume of the conductive liquid inside the cavity 315 is adjusted. In the example shown in FIG. 12 the discone cavity 315 is full of the conductive liquid.

A metallic cone, representative of the pump and reservoir arrangement 200 shown in FIG. 12, was simulated in the centre of the conical housing 310 and the resultant reflection loss magnitude is shown in FIG. 13. As can be seen, since there are no radiating fields inside the conical housing 310 of the discone antenna 300, the impact of metallic objects placed inside the cone 310 on the signal match and patterns is negligible.

FIG. 14 shows another example of the second embodiment of the antenna 300 wherein the discone cavity 315 is only semi-filled with a conductive liquid. The resultant match pattern is shown in FIG. 15. Comparison with the match pattern shown in FIG. 13 demonstrates that that match has changed, potentially degrading at lower frequencies and shifting the operating impedance bandwidth to shorter wavelengths. In this way, by careful design of the conductive liquid pathways (e.g. the internal shape of the cavity), it may be possible to optimise the antenna 300 performance for certain bands by partially filling the cavity 315, or to shift the overall operating band to different frequencies by adjusting the overall extent of filling of the cavity 315.

V-Shaped Antenna

In a further embodiment of the present invention, and as shown in FIG. 16, an antenna 400 comprises a housing formed of two elongate arms 410 extending at an angle from each other in a "V" formation. The "V" shaped arms 410 comprise an internal cavity 415 for retaining an electrically conductive liquid. The conductive liquid is held within the cavity 415 of the arms 410, and acts a first element for the antenna 400. The amount of conductive liquid in the cavity 415 may be adjusted using a pump and reservoir arrangement 200 as described before, so as to tune the antenna 400 for use at different frequencies and frequency ranges. The hollow "V" shape of the cavity 415 results in the conductive liquid collecting in the bottom of the arms 410, therefore forming a "V" shaped conductive element no matter how much conductive liquid is present in the cavity 415. The antenna 400 also incorporates a second element 420 acting as a ground plane. In one example, the ground plane 420 is narrower than the broadest diameter (i.e. the top) of the "V" shaped arms 410. The ground plane 420 and the arms 410 are separated from each other by an insulating layer 430, e.g. a dielectric foam. In the example shown, the arms 410 also comprise a small metallic cone 440 at the base of the arms 410, connected to a first conductive channel of a twin-conductor feedline 450. The signal from the first feedline 450 conductor is received/transmitted from/to the conductive liquid within the cavity 415 via capacitive coupling with the metallic cone 440. This removes the need to have the conductive feedline 450 in direct electrical contact with the conductive liquid within the cavity 415. The second conductive channel of the feedline 450 is in electrical contact with the ground plane 420. The rest of the feedline 450 may be fed through a small hole in the ground plane 420 and insulating layer 430 to reach the metallic cone 440.

In a preferred example of any of the above-described embodiments of the invention, the electrically conductive liquid is a liquid metal, either alone or mixed with another inert (i.e. dielectric) liquid. In another example, the liquid metal may be either a pure metal or a metal alloy, and in a preferred example the liquid metal is a eutectic alloy of Gallium, Indium and Tin, such as Galinstan®. Compared to other liquid metals, such as Mercury, Galinstan® is comparatively non-toxic, and is a liquid at room temperature with reasonable viscosity and good electrical characteristics. Galinstan® has a room temperature conductivity of approximately $3.46\times10^6$ S/m, which is around 6% that of pure copper but is comparable to mild steel and somewhat better than stainless steel. To all intents and purposes, at microwave frequencies, it may be regarded as a "perfect electrical conductor" (PEC).

In one example, the hollow housing/arms 110;310;410 are 3D printed or PLA manufactured.

In another example, the antenna device 100;300;400 is tuned to microwave wavelengths, i.e. between 300 MHz (100 cm) and 300 GHz (0.1 cm). In a further example, the conductive liquid patch antenna 100 can be incorporated into a cavity within a flexible housing 110. This could provide a means to incorporate a microwave (or other frequency range) antenna into fabrics, or other flexible materials. By adjusting the amount of conductive liquid in the patch antenna cavity 115, the bandwidth and range of the antenna 100 can be adjusted as desired.

It is also anticipated that the novel and inventive features of the present invention may be incorporated into a phase shift module, connecting and disconnecting different lengths of transmission line, potentially at high microwave powers where conventional semiconductor devices are unsuitable.

In alternative examples to those described above, the discone 300 and "V" shaped 400 antennas are truncated, i.e. having a substantially flat base at the apex where the conical walls 310 or arms 410 would meet. In another example, the cavity 315;415 may be formed by placing two cones, or "V" shaped housing articles, one inside the other. In some examples of the present invention, the cavity 315;415 formed within the housing may be shaped to guide the conductive liquid into channels and pathways within the housing, forming differently shaped antennas. The walls of the housing surrounding the internal cavity 315;415 may be separated from each other by struts or other supports which can act to maintain the void, and/or channel the conductive liquid within the void into pathways so as to tune the operating frequency of the antenna.

In another example, the second element may also be formed by an electrically conductive liquid within a cavity of a housing. In some examples, the amount of conductive liquid within the second element cavity may also be adjusted as desired. As will be appreciated by anyone skilled in the art, the discone housing may be moulded in other shapes, for example, although not limited to: pyramidal, parabolic, cupola, etc. Furthermore, the patch antenna housing may have non-circular horizontal cross-section, e.g. hexagonal.

The invention claimed is:

1. An antenna, comprising:

a housing having an internal cavity, the internal cavity having a bowl or cone shape and configured to contain an electrically conductive liquid, such that the electrically conductive liquid collects at least in a central bottom region of the bowl or cone shape of the cavity;

a feedline including a first feedline conductor and a second feedline conductor, and for connecting the antenna to a receiving and/or transmitting device, wherein the first feedline conductor is adapted to receive/transmit a signal from/to the conductive liquid; and a conductive ground plane connected to the second feedline conductor.

2. The antenna according to claim 1, wherein the conductive ground plane is separated from the housing by an insulator.

3. The antenna according to claim 2, wherein the insulator is a foam, and/or wherein the conductor feedline is a coaxial cable.

4. The antenna according to claim 1, wherein the conductive liquid is a metal or metal alloy.

5. The antenna according to claim 4, wherein the conductive liquid is a liquid metal, and the liquid metal is Galinstan®.

6. The antenna according to claim 1, comprising:

a pump configured to adjust an amount of the conductive liquid within the internal cavity within the housing;

a power source to power the pump; and a reservoir for the conductive liquid.

7. The antenna according to claim 6, wherein the housing comprises a vent to allow the surrounding atmosphere to escape or enter as the conductive liquid is pumped into or out of the internal cavity.

8. The antenna according to claim 1, wherein:

the housing is planer such that its width and length are wider and longer, respectively, than its height; and the internal cavity extends downwards towards the central bottom region along a portion of the housing height in a tapered or concave fashion, thereby forming the bowl or cone shape.

9. The antenna according to claim 8, wherein the housing is flexible, and the bowl or cone shape is truncated or not truncated.

10. The antenna according to claim 1, wherein the housing is conical.

11. The antenna according to claim 2, wherein the housing is conical, and wherein the ground plane is narrower than the broadest diameter of the conical housing.

12. The antenna according to claim 1, wherein the housing comprises two elongate arms extending at an angle from each other in a "V" formation or a truncated "V" formation, thereby forming the bowl or cone shape.

13. An antenna, comprising:

a housing having an internal cavity defined within one or more walls of the housing and a metallic unit beneath the internal cavity, the internal cavity configured to contain an electrically conductive liquid; and a feedline including a first conductor and a second conductor, and for connecting the antenna to a receiving and/or transmitting device, wherein the first conductor is connected to the metallic unit;

wherein a signal from the first conductor is received/transmitted from/to the conductive liquid via capacitive coupling.

14. The antenna according to claim 1, wherein the first feedline conductor engages the conductive liquid within the internal cavity directly.

15. An antenna, comprising:

a radio frequency (RF) feedline to connect the antenna to a receiver device and/or a transmitter device;

a housing having an internal cavity configured to contain an electrically conductive liquid within the internal cavity, to receive and/or transmit a signal from and/or to the RF feedline, the internal cavity having a cross-sectional shape that tapers towards a central bottom region of the internal cavity, such that the electrically conductive liquid collects at least in the central bottom region of the internal cavity, the electrically conductive liquid providing a conductive antenna element having the cross-sectional shape;

a pump configured to adjust an amount of the electrically conductive liquid in the internal cavity, thereby adjusting a size of the cross-sectional shape of the conductive antenna element; and a conductive ground plane.

16. The antenna according to claim 15, wherein the conductive ground plane is separated from the housing by an insulator.

17. The antenna according to claim 15, comprising a feedline including a first feedline conductor and a second feedline conductor, wherein the first feedline conductor is configured to receive/transmit a signal from/to the conductive liquid, and the second feedline conductor is connected to the conductive ground plane.

18. The antenna according to claim 13, comprising:

a conductive ground plane separated from the housing by an insulator and connected to the second feedline conductor.

19. The antenna according to claim 13, comprising:

a pump configured to adjust an amount of the conductive liquid within the internal cavity;

a power source to power the pump; and a reservoir for the conductive liquid.

20. The antenna according to claim 19, wherein the power source is a battery.

* * * * *